United States Patent
Rombola et al.

(10) Patent No.: US 6,912,325 B2
(45) Date of Patent: Jun. 28, 2005

(54) REAL TIME ELECTRONIC REGISTRATION OF SCANNED DOCUMENTS

(75) Inventors: Gregory Rombola, Spencerport, NY (US); Mark J. Jablonski, Alden, NY (US); Larry L. Christensen, Henrietta, NY (US); Thomas J. Wetzel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/572,259

(22) Filed: May 17, 2000

(65) Prior Publication Data

US 2003/0035593 A1 Feb. 20, 2003

(51) Int. Cl.[7] .............................. G06K 9/36; H04N 1/04
(52) U.S. Cl. ....................................... 382/289; 358/488
(58) Field of Search ................................ 382/203, 266, 382/282, 289, 290, 291, 292, 295, 296; 358/1.18, 474, 475, 486, 444, 488; 355/80–84

(56) References Cited

U.S. PATENT DOCUMENTS

| | | | | |
|---|---|---|---|---|
| 4,926,490 A | * | 5/1990 | Mano ......................... | 382/177 |
| 5,313,311 A | * | 5/1994 | Brandkamp ................. | 358/474 |
| 5,373,371 A | | 12/1994 | Masui | |
| 5,528,387 A | * | 6/1996 | Kelly et al. ................. | 358/488 |
| 5,699,494 A | | 12/1997 | Colbert et al. .............. | 395/114 |
| 5,818,976 A | * | 10/1998 | Pasco et al. ................ | 382/289 |
| 5,918,877 A | * | 7/1999 | Takei et al. ................. | 271/261 |
| 5,946,461 A | | 8/1999 | Landry et al. .............. | 395/117 |
| 6,026,258 A | | 2/2000 | Fresk et al. ................. | 399/87 |
| 6,034,784 A | * | 3/2000 | Gatto et al. ................ | 358/1.18 |
| 6,064,778 A | | 5/2000 | Pasco et al. | |
| 6,157,439 A | * | 12/2000 | Rousseau et al. ........... | 355/61 |

OTHER PUBLICATIONS

Manual, Adobe® "Portable Document Formal Reference Manual, Version 1.3," pp. 2–518.
"Adobe® Acrobat 4.0 Guide," pp. 1–595.
Brochure, "Quite Imposing Plus Online Guide 1.2.".
Brochure, "W3C Extensible Markup Languages (SML) 1.0," W3C Recommendation Feb. 10, 1998, pp. 1–32.
Brochure, "StampPDF™ Users Guide—An Acrobat Plugin," pp. 6–82, © 1999 Digital Applications, Inc.
Brochure, "TIFF™ Revision 6.0" Specification, pp. 4–120.
Manual, "TWAIN Specification Version 1.8," pp. 1–516.
Manual, "Open Document Management API, Version 2.0," pp. 1–87.
Brochure Guide, "Network Imaging System Interface Development Guide, Release 2," pp. 1–1–6–4.
Dan Phelps and John Thompson, "Rendering For Electronic Printers and Copiers," pp. 1–72.
Kodak Publication No. FN9074 May 1985—"Fundamentals of Digital Copiers—Revision 1," pp. 1–49.
European Search Report EP 01 11 0123.

* cited by examiner

*Primary Examiner*—Kanjibhai Patel
(74) *Attorney, Agent, or Firm*—Kevin L. Leffel; Richard A. Romanehik

(57) ABSTRACT

The registration and skew information of a document about to be scanned are detected prior to capturing the entire image of the document. Two sensors, a fixed distance apart, are used to detect the document skew. A third sensor is used to detect the edge position of the document. Paper sensors in the Automatic Document Feeder (ADF) are used to determine the document size. The data from the skew sensors are used to calculate the required skew correction angle and direction by which to rotate the image. The document edge position information together with skew information is used to determine the exact location of a corner of the document. This information is used to correct skewed image in real-time, during scanning the document.

20 Claims, 9 Drawing Sheets

| Paper Size | Orientation | Image Width |
|---|---|---|
| Letter (8.5 x 11) | Portrait | 11 inches |
| Letter (8.5 x 11) | Landscape | 8.5 inches |
| 5.5 x 8.5 | Portrait | 8.5 inches |
| Legal (8.5 x 14) | Landscape | 8.5 inches |
| Letter Tab (9 x 11) | Portrait | 11 inches |
| Ledger (11 x 17) | Landscape | 11 inches |
| A5 (148 x 210) | Portrait | 210 mm |
| B5 (182 x 257) | Portrait | 257 mm |
| B5 Tab (197 x 257) | Portrait | 257 mm |
| A4 (210 x 297) | Portrait | 297 mm |
| A4 (210 x 297) | Landscape | 210 mm |
| A4 Tab (225 x 297) | Portrait | 297 mm |
| A3 (420 x 297) | Landscape | 297 mm |

FIG. 6

|  #  | H/W Spec. Name | Calculation |
| --- | --- | --- |
| 1 | Horizontal Delta X Direction | 2048 * cos(θ) = hdel - x |
| 2 | Horizontal Delta Y Direction | 2048 * cos(θ) = hdel - y |
| 3 | Vertical Delta Y Direction, Vdel-y | if θ > 0, 2048*cos(θ)<br>if θ < 0, -2048*cos(θ) |
| 4 | Vertical Y Plus Horizontal Y | hdel_y + vdel_y |
| 5 | Horizontal X Plus Horizontal Y | hdel_x + hdel_y |
| 6 | Output Vertical Delta Y | absolute value of (vdel_y) |
| 7 | Output Vertical Delta X | -2048 * sin(θ) = Vdel-x |
| 8 | Input X Address Start | 0 |
| 9 | Input Y Address Start | 0 |
| 10 | Output X Address Start | x-fc-rot-hires |
| 11 | Output Y Address Start | y-fc-rot-hires |
| 12 | Line Size, w | width of output image (pixels) |

FIG. 7

| | Name | Description | Units |
|---|---|---|---|
| Constants (802) | 600 | Scanner dpi | pixels/inch or lines/inch |
| | 1578 | encoder counts per inch | ec/inch |
| | K1 | conversion constant to convert encoder counts to pixels or lines, K1=600/1578 | pixels/ec |
| | 400 | Cross track sensor dpi | pixels/inch |
| | K2 | conversion constant to convert cross track sensor resolution reading to scanner 600 DPI resolution. (Note this will depend on the specific device to be used. For current device used, the sensor has 400 DPI resolution.) K2=Scanner Resolution/sensor resolution = 600/400=1.5 | no units |
| | 3.1415926535 | π | radians |
| Calibration data (804) | x_frs | x coordinate of front registration sensor | pixels |
| | y_frs | y coordinate of front registration sensor | pixels |
| | x_rrs | x coordinate of rear registration sensor | pixels |
| | y_rrs | y coordinate of rear registration sensor | pixels |
| | x_xts | x coordinate of cross track sensor | pixels |
| | y_xts | y coordinate of cross track sensor = Ys | pixels |
| | y_off | in track offset between two sensors y_rrs - y_frs | pixels |
| | x_off | cross track offset between two sensors x_rrs - x_frs | pixels |

FIG. 8(a)

|  | Name | Description | Units |
|---|---|---|---|
| Input Variables | frs_ec | encoder counts when front registration sensor struck | ec |
| | rrs_ec | encoder counts when rear registration sensor struck | ec |
| | xts | cross track sensor reading (0-127) | xts pixels |
| | W | cross track dimension of original (this is known before scanning starts) | pixels |
| Calibrations | delta_ec | The sign of this result is chosen so as to conform with angle conventions described earlier.<br>rrs_ec-frs_ec | ec |
| | delta_In | K1*delta_ec | lines |
| | xts_pixels | K2 * xts, tope edge of paper when last sensor is struck | pixels |
| | x_topedge | Position of top edge of paper when last sensor is struck is the sum of position 0 of the sensor (x_xts) plus the offset from that position (the sensor reading)<br>x_topedge = x_xts + xts_pixels = $X_s$ | pixels |
| | $\phi$ | The skew angle is a function of the difference in encoder counts between the sensors and the in track delta between the sensors. The in track delta between the sensors is obtained from the calibration process.<br>angle to rotate image = atan[(delta_In + y_off)/x_off] | radians |
| | $\theta$ | angle to rotate image = 180 x $\phi$ / $\pi$ | degrees |
| | m, slope | (delta_In + y_off)/x_off = tan ($\phi$) | no units |

806 labels Input Variables; 808 labels Calibrations.

FIG. 8(b)

(a): If front sensor was second to be struck by paper then:

$$x\_fc = -W \cdot \cos(\theta) + (m^2 \cdot x\_frs + m \cdot (y\_xts - y\_frs) + x\_topedge)/(m^2+1)$$
$$y\_fc = -W \cdot \sin(\theta) + (m^2 \cdot y\_xts + m \cdot (x\_topedge - x\_frs) + y\_frs)/(m^2+1)$$

(b): If rear sensor was second to be struck by paper then:

$$x\_fc = -W \cdot \cos(\theta) + (m^2 \cdot x\_rrs + m \cdot (y\_xts - y\_rrs) + x\_topedge)/(m^2+1)$$
$$y\_fc = -W \cdot \sin(\theta) + (m^2 \cdot y\_xts + m \cdot (x\_topedge - x\_rrs) + y\_rrs)/(m^2+1)$$

(c): First step:

$$x\_fc\_rot = \text{round}(x\_fc \cdot \cos(\theta) + y\_fc \cdot \sin(\theta))$$
$$y\_fc\_rot = \text{round}(y\_fc \cdot \cos(\theta) - x\_fc \cdot \sin(\theta))$$

(d): Second step:

$$x\_fc\_rot\_hires = x\_fc\_rot \cdot hdel.x + y\_fc\_rot \cdot vdel.x$$
$$y\_fc\_rot\_hires = x\_fc\_rot \cdot hdel.y + y\_fc\_rot \cdot hdel.x$$

FIG. 9

REAL TIME ELECTRONIC REGISTRATION OF SCANNED DOCUMENTS

FIELD OF THE INVENTION

This invention relates generally to document scanners, and more particularly to a device and a method for correcting a skewed image of a skewed document to be scanned when fed through an automatic document feeder.

BACKGROUND OF THE INVENTION

Documents scanned using an Automatic Document Feeder ("ADF") may be mis-registered or skewed, which result in a skewed image. A document may be skewed by a shift in in-track and/or cross-track directions, or by an angular rotation. To correct the skewed image, some mechanical techniques have been proposed. However, these mechanical methods tend to be unreliable. This problem may be partially solved by using de-skew software algorithms that have been proposed to correct only angular rotations errors. These methods, however, may cause reduced productivity, because the whole image of the document has to be captured, stored in memory, and then retrieved for correction. These prior methods operate on post-rendered binary images that may result in poor image quality, because they do not use the full bit-depth image captured by the scanner.

There is, therefore, a need for a method and system for real-time skew correction that operates during scan operation and prior to rendering the entire image, which does not reduce productivity and image quality.

BRIEF SUMMARY

The present invention is defined by the following claims, and nothing in this section should be taken as a limitation on those claims. By way of introduction, a method for providing skew correction information for a skewed image of a skewed document includes determining skew information, a corner location for the skewed image, and a dimension of the skewed image to determine skew correction information for the skewed image prior to scanning the skewed document. The method also determines the rotation angle and the rotation direction for the skewed image. The method then transforms the corner location for the skewed document into a rotated location, where the skewed image will be corrected.

According to another embodiment of the present invention, a method for providing skew correction information for a skewed image of a skewed document in a scanner includes reading a first sensor data indicating first skew information about the skewed document when the first sensor is struck by the skewed document, reading a second sensor data indicating second skew information about the skewed document when the second sensor is struck by the skewed document, reading a third sensor data indicating third skew information about the document when the second sensor is struck by the skewed document, and then determining skew correction information for the skewed image, using the first, second, and third skew information, prior to scanning the skewed document.

According to yet another embodiment of the present invention, a system for correcting a skewed image of a skewed document in a scanner includes a plurality of skew sensors located in a straight line perpendicular to the document flow direction of the scanner, at least one lateral sensor located along the document flow direction, means for reading the skew sensors and the lateral sensor, means for determining skew correction information for the skewed image prior to scanning the skewed document, and means for correcting the skewed image during real-time scanning of the skewed document. The system also includes encoder counters providing data indicating relative position and orientation of the skewed image. The system further includes means for determining a corner position for the skewed document in a rotated location and means for rotating the skewed image such that the skewed image is registered without being skewed.

The present invention is defined by the following claims, and nothing in this section should be taken as a limitation on those claims.

BRIEF DESCRIPTION OF SEVERAL VIEWS OF THE DRAWINGS

The present invention is illustrated by way of example and not limitation in the accompanying figures. In the figures, like reference numbers indicate identical or functionally similar elements. Additionally, the left-most digit(s) of a reference number identifies the figure in which the reference number first appears.

FIG. 6 shows a presentation of common paper sizes and the corresponding image widths;

FIG. 7 shows a presentation of skew correction parameters;

FIGS. 8(a) and 8(b) show presentations of intermediate parameters required for calculation of skew correction parameters of FIG. 7; and FIG. 9 shows a presentation of calculation of corner position coordinates.

DETAILED DESCRIPTION OF PRESENTLY PREFERRED EMBODIMENTS

Figure 1:
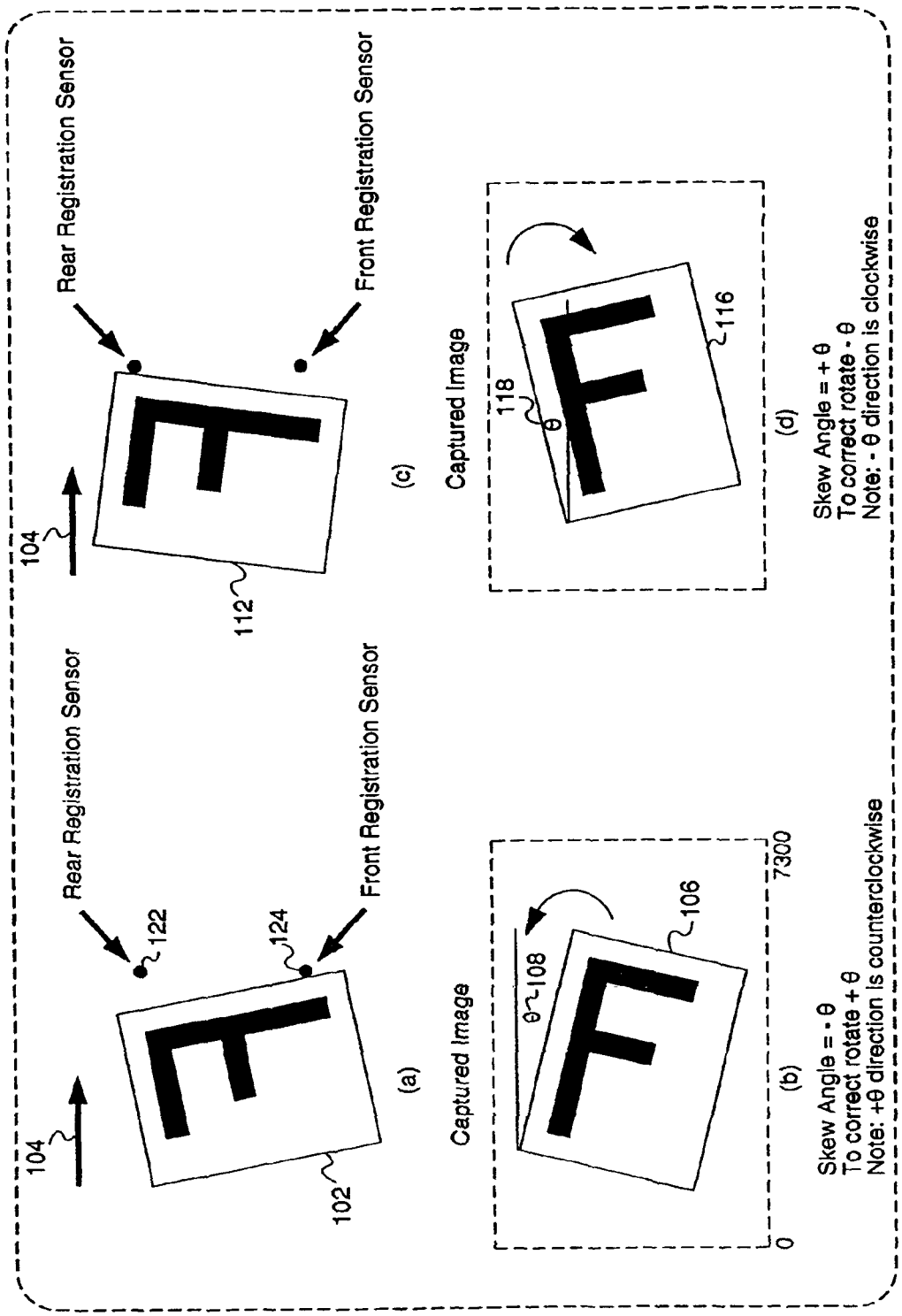
FIG. 1 shows a presentation of two skewed images and their skew angle conventions.

The presently preferred embodiments of the invention are now described in reference to the drawings. Referring now to the drawings, FIG. 1 shows two skewed images and the corresponding skew angle conventions. The term "skew" used here includes angular rotation, shift in the in-track direction (parallel to the scanner paper motion), and/or lateral shift in the cross-track direction (perpendicular to the scanner paper motion). Part (a) shows a document 102 being fed into a scanner along the scanner paper feed path 104. However, this document is skewed in a counterclockwise direction as being fed into the scanner. Consequently, the scanner would produce an image of the skewed document, which would also be skewed. Part (b) shows the captured image 106 of the skewed document 102, which would be skewed by a skew angle θ 108, if not corrected. The angle convention adopted in the presently preferred embodiment is assigning negative sign to a skew angle in counterclockwise direction and assigning positive sign to a skew angle in clockwise direction. Therefore, the skew angle θ 108 in part (b) is considered a negative skew angle. Part (C) shows a document 112 being fed into a scanner along the scanner paper feed path 104. However, this document is skewed in clockwise direction. Part (d) shows the captured image 116 of the skewed document 112, which would be skewed by a skew angle θ 118, if not corrected. Therefore, the skew angle in part (d) a positive skew angle.

According to the presently preferred embodiments, a skewed image may be corrected in real-time, during scan operation, and before the document image is completely rendered. This method has the advantages of reducing productivity loss of the scanner and improving the image quality over prior skew correction methods, because this method does not require capturing and rendering the whole image, storing the image in memory, and retrieving the image for skew correction. Accordingly, the document being scanned may be examined for skew effect prior to capturing its image, and if it is skewed, its skewed image may be corrected in real-time as the document is being scanned.

According to the presently preferred embodiment, at least two skew sensors (122 and 124) are placed in a straight line perpendicular to the unskewed document flow direction 104 of a scanner. Each sensor includes at least one encoder counter that may be read when struck by a skewed document to determine the relative time that each sensor is struck by the skewed document. FIG. 1 shows two skew sensors, a rear skew sensor 122 and a front skew sensor 124. Depending on which direction a document is skewed, one of these two sensors is struck first by the skewed document. This information may be used to determine the skew direction. For example, part (a) of FIG. 1 shows the front skew sensor 124 being struck first by the document 102, indicating the counterclockwise skew direction of the document 102. On the other hand, part (c) of FIG. 1 shows the rear skew sensor 122 being struck first by the document 112, indicating the clockwise skew direction of the document 112

To correct a skewed image, the skewed image may be rotated by the skew angle of the skewed document, in the same direction that the document is skewed. The skew angle and direction of skew of a document may be determined using the encoder counts read from the two sensors 122 and 124. The scanner includes a processing unit, which may be interrupted, when each one of these two sensors is struck by a skewed document, to record the respective encoder count. The skew angle may be determined based on the difference in encoder counts of the two skew sensors, the distance between the two skew sensors, and the speed of document being fed into the scanner. From the encoder counts of the two skew sensors, the time difference between the two sensors that are struck with the skewed document may be determined. Knowing the speed of the document being fed into the scanner and the sensors time difference, the distance traveled by the document in the scanner may be determined. Based on the distance traveled by the document and the distance between the two skew sensors, the skew angle of the skewed document may be determined, as explained in more detail below. The skew direction may be found based on the sign of the difference in encoder counts of the two skew sensors, or based on the order in which the skew sensors are struck by the skewed document, as will be discussed in more detail below.

Figure 2:
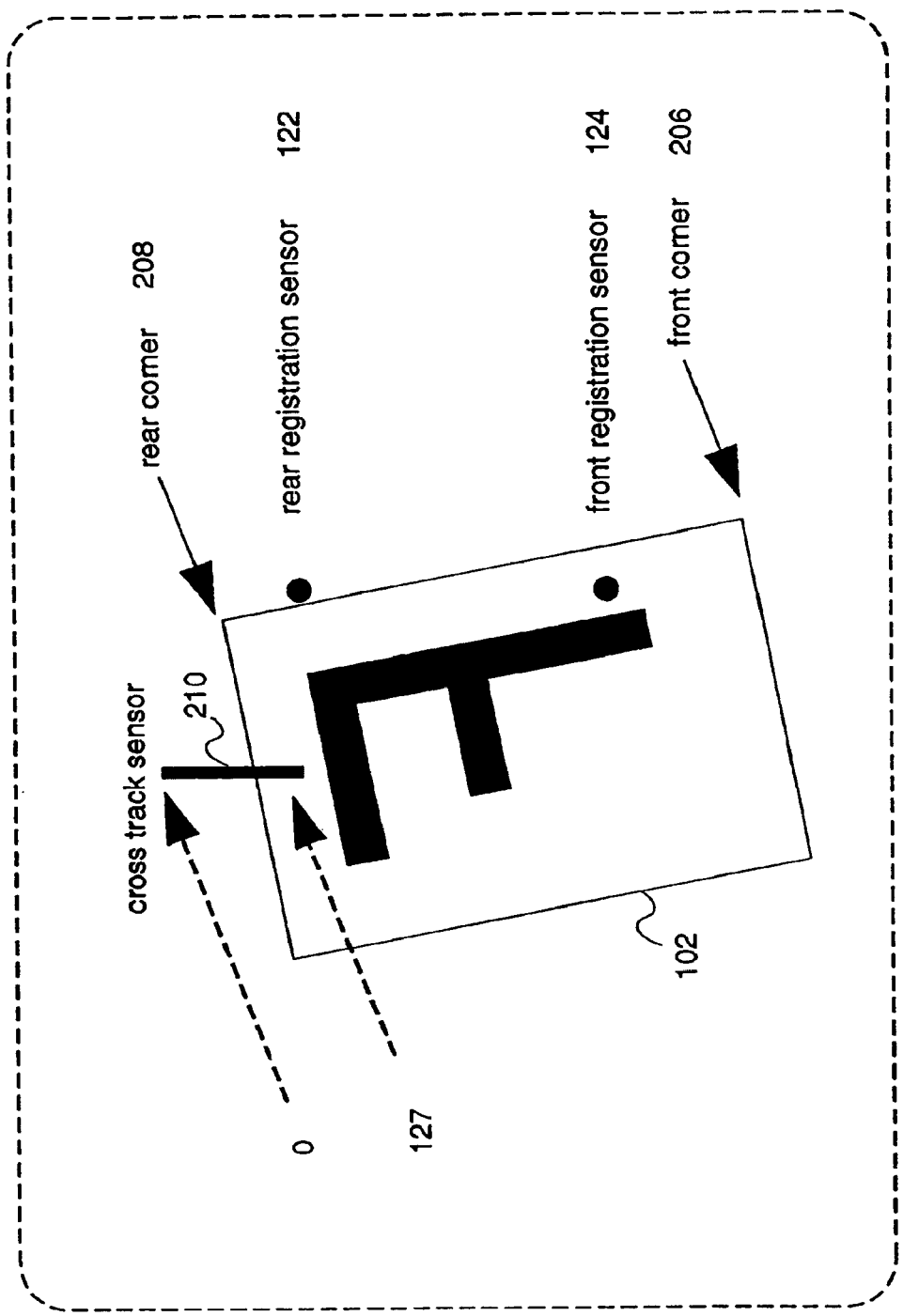
FIG. 2 shows a presentation of a skewed document.
Figure 3:
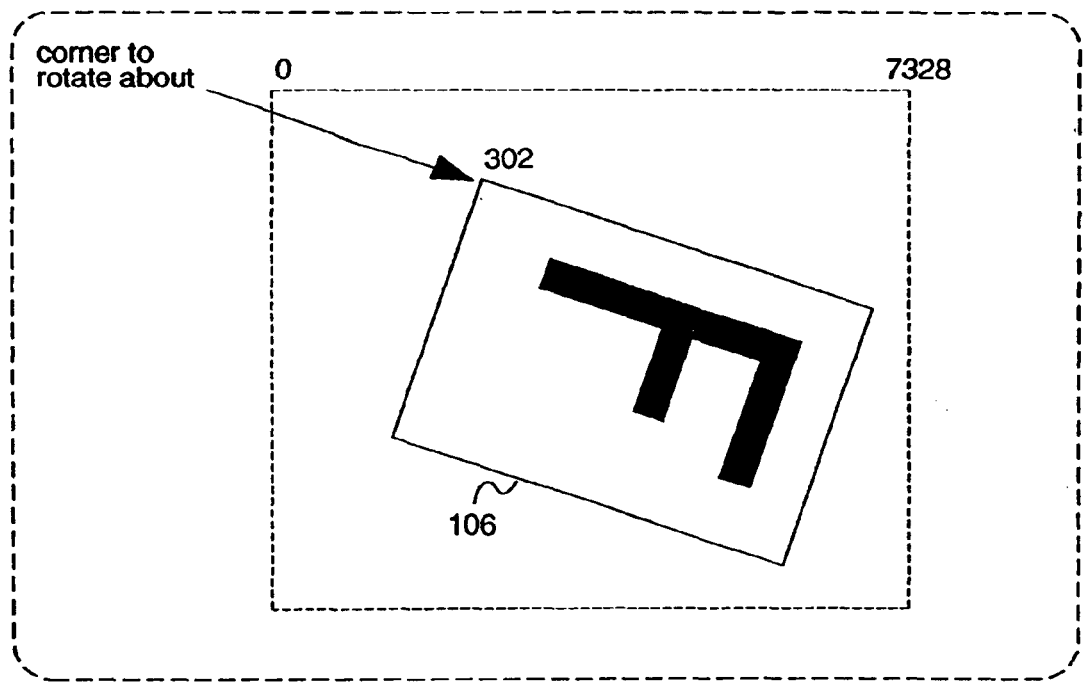
FIG. 3 shows a presentation of a skewed image of the skewed document of FIG. 2.

FIG. 2 shows the skewed document 102 of FIG. 1, part (a), which may be presumed to have been rotated about its front corner 206 by a skew angle. FIG. 3 shows how the front corner 206 of the skewed document 102 would be transformed to the rear corner 302 on the skewed image 106. As shown in FIG. 3, the document is over-scanned for not to miss any part of the skewed document, if it is skewed. However, the corrected image should be adjusted so that it appears on the right coordinates that match the document. According to the presently preferred embodiment of the present invention, after finding the position coordinates of rear corner 302, to correct the skewed image 106 in FIG. 3, the skewed image 106 may be rotated about its rear corner 302 by the skew angle in the same direction that the document is skewed, as discussed in connection with part (b) of FIG. 1. As mentioned above, the skew angle and direction of skew of a document may be determined using the encoder counts read from the two sensors 122 and 124. However, the position coordinates of the rear corner 302 of the skewed image 106 have to be determined. This rear corner position coordinates may be used to define where the first pixel of the image should start. Consequently, the in-track and/or cross-track mis-registration of the skewed image will be corrected, regardless of whether or not the document has been rotationally skewed. The skew angle, skew direction, and the corner position coordinates of the skewed image may be stored in the correction board registers, as explained in more detail below, before the scanner starts capturing the image. Thereafter, the scanner rotates each segment of the real-time captured skewed image of the skewed document about the rear corner of the skewed image.

According to the presently preferred embodiment, at least one "cross-track" sensor is also used to sense the position of the top edge of the document during scan operation. The cross-track sensor may include, preferably, a linear CCD array sensor. The cross-track sensor is read by the scanner's processing unit at the time the second skew sensor is struck by the document. FIG. 2 shows a cross-track sensor 210, and FIG. 4 show its operation.

Figure 4:
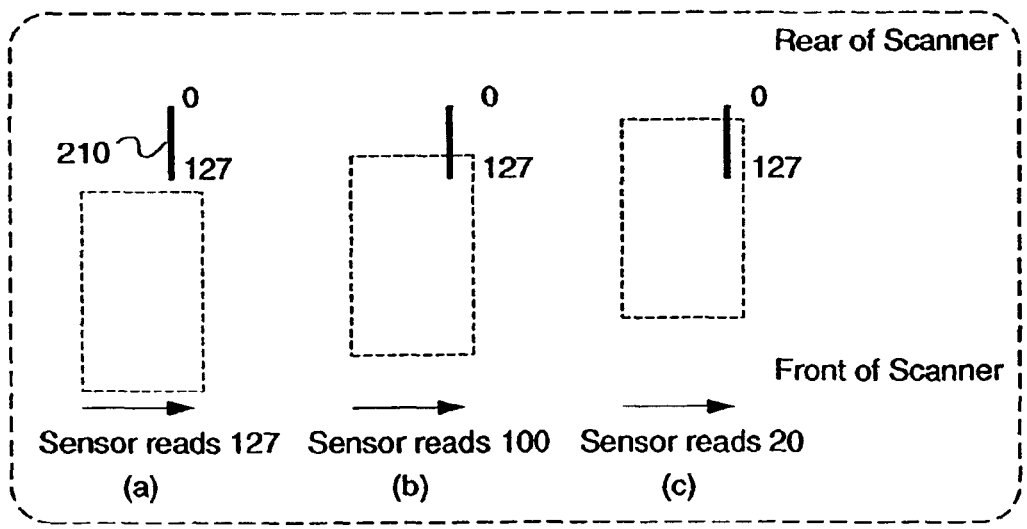
FIG. 4 shows a presentation of a cross-track sensor.

Referring to FIG. 4, when a document being fed into a scanner does not cover any part of the cross-track sensor 210, e.g. part (a), the sensor reads its maximum count of, for example 127. However, when the document covers a portion of the sensor, e.g. parts (b) and (c), the sensor reads fewer counts as shown, depending on how much of the sensor is covered by the skewed document. The cross-track sensor's reading, $x_{ts}$, which indicates the relative lateral position of the top edge of the document at the time the second skew sensor is struck by a skewed document, is used to determine the coordinates of the cross track sensor, $x_s$ and $y_s$. The image-space position coordinates of the skew sensors and the cross-track sensor are obtained from the calibration procedure of the skew sensors, as explained below.

Figure 5:
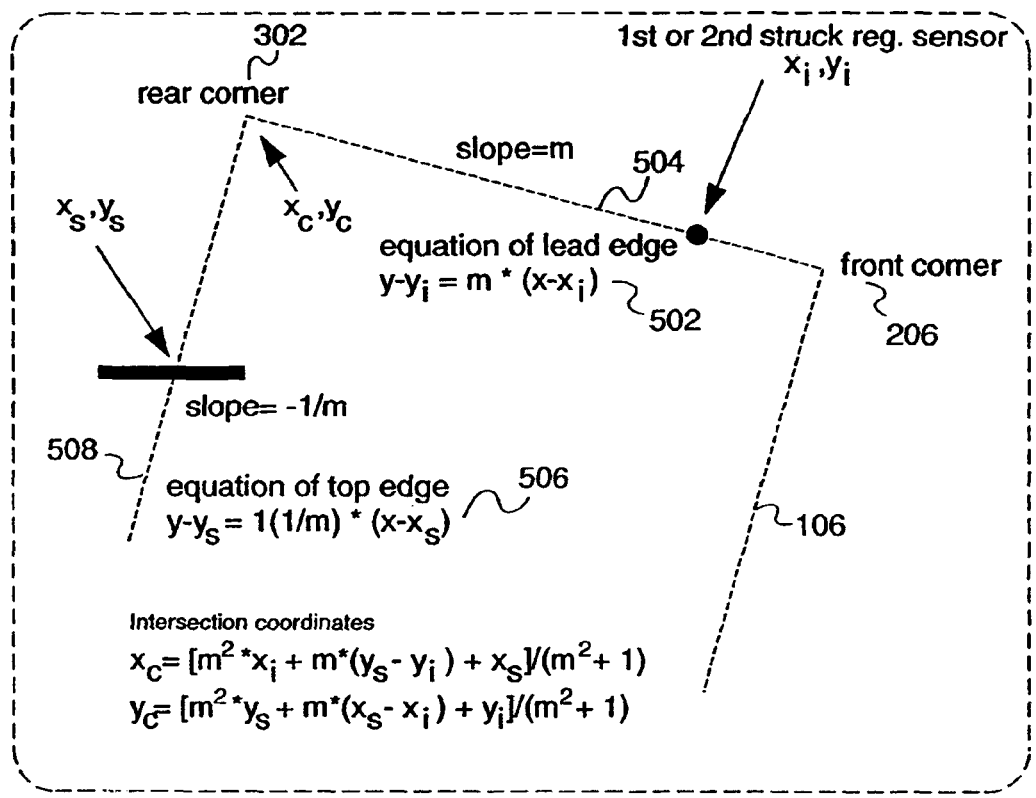
FIG. 5 shows a presentation of a skewed image and the equations for the lead edge and the top edge of the skewed image.

FIG. 5 shows the skewed image 106, as shown in FIG. 3, and the line equation 502 for the lead edge 504 and the line equation 506 for the top edge 508 of the skewed image 106. Assuming these two edges are perpendicular, by intersecting their two line-equations 502 and 508, the position coordinates of the image rear corner 302, $x_c$ and $y_c$, my be determined. This rear corner position coordinates may be used to define where the first pixel of the image should start, to correct the in-track and/or cross-track mis-registration of the skewed image, regardless of whether or not the document has been rotationally skewed. The position coordinates of the front corner 206 my be determined if the image width of the document and the skew angle are known.

FIG. 6 shows the image widths for common standard-size papers for both portrait and landscape orientations. In the presently preferred embodiment, there are generally 5 image widths for preset widely used standard papers. However, other paper dimensions may be also used. The dimensions of the scanner paper may be detected by the scanner's paper tray sensors, and the corresponding image width may be found by using a lookup table, such as the one provided in FIG. 6.

FIG. 7 shows a list of skew correction parameters 702 that may be preferably used to program a scanner for correcting a skewed image. The parameters may be obtained by the calculation of the corresponding formula 704, or by pre-computed table-lookups. In one embodiment, the scanner may include a correction board, including twelve registers, preferably each having 24 bits, which may be loaded with the parameter values 702, before starting to capture the image. The "Output X Address Start" and "Output Y Address Start" parameters represent the document corner coordinates in the high-resolution format required by the skew correction algorithm. These coordinates are obtained using FIGS. 8(a), 8(b), and 9.

FIGS. 8(a) and 8(b) show the lists of intermediate parameters for calculating the skew correction parameters 702 in FIG. 7. The parameters provided in FIG. 8(a) include: constants parameters 802 and calibration parameters 804. The constants parameters 802 are exemplary parameters provided for a certain type of scanner. However, the inventive concepts presented in connection with the presently preferred embodiment disclosed herein are equally applicable to other scanners or similar devices, including photocopier, fax machines, and the like. The calibration parameters 804 are obtained by calibrating the scanner by a test document that has specific features on it. Through the calibration process, the image space coordinates of the sensors are obtained.

FIG. 8(b) shows input parameters 806 and calculations 808. After determining the intermediate parameters listed in FIGS. 8(a) and 8(b), the high resolution position coordinates of the front corner 206 may be determined using FIG. 9, as explained below.

FIG. 9 shows a set of equations for calculating the position coordinates of the front corner 206 of the skewed document 106 (FIG. 2), depending on whether the front sensor was second to be struck by the skewed document, part (a), or whether the rear sensor was second to be struck by the skewed document, part (b). The position coordinates of the front corner 206 of the skewed document "x-fc" and "y-fc" are calculated from the position coordinates of the rear corner 302 of the skewed image as provided in FIG. 5, the image width as provided in FIG. 6, and the skew angle as provided by the calculations 808 in FIGS. 8(b). Part (c) of FIG. 9 shows the required equations for transforming the position coordinates of the front corner 206 of the skewed document 102 to the rotated coordinate space, which is the space that the captured skewed image should be transferred to for correcting the skewed image. Part (d) of FIG. 9 shows the high-resolution corner coordinates used by the scanner. As mentioned above, the skew correction algorithm, according to presently preferred embodiment, captures each segment of the real-time skewed image, and rotates it to the desire location as determined by the equations provided in part (d) of FIG. 9.

The above information may be used to program the image processing electronics of the scanner, which implements the image rotation algorithm. This algorithm preferably uses a Cubic Convolution Interpolation method, as discussed in Keys' article published in *IEEE Transaction on Acoustics, Speech, and Signal Processing*, Vol. ASSP-29, No.4, December 1981, pages 1153–1160, which is incorporated herein in its entirety by reference. However, other interpolation methods may also be used, i.e., bilinear interpolation. Knowing the corner position of the document and the document size, the image may be cropped so that no registration error occurs.

More details of the presently preferred embodiments of the present invention may be found in the attached Appendix A.

It will be appreciated that a wide range of changes and modifications to the presently preferred embodiments of skew correction method and system disclosed herein are contemplated. Accordingly, while preferred embodiments have been shown and described in detail by way of examples, further modifications and embodiments are possible without departing from the scope of the invention as defined by the examples set forth. It is therefore intended that the invention be defined by the appended claims and all legal equivalents.

What is claimed is:

1. A method for providing skew correction information for a skewed image of a skewed document, said method comprising:
    (a) determining skew information for said skewed document;
    (b) determining a corner location for said skewed image;
    (c) determining a dimension for said skewed image; and
    (d) determining said skew correction information for said skewed image, based on said skew information, said corner location, and said dimension, prior to start of scanning said skewed document.

2. The method of claim 1 wherein said determining skew information includes:
    (e) reading a plurality of sensors and determining which sensor is struck by said skewed document.

3. The method of claim 2 wherein said determining said skew information includes:
    (f) determining a rotation angle for said skewed image; and
    (g) determining a rotation direction for said skewed image.

4. The method of claim 3 wherein said determining a corner location includes:
    (h) determining a corner location for said skewed document.

5. The method of claim 4 wherein said determining said skew correction information includes:
    (i) transforming said corner location for said skewed document into a rotated location, wherein said skewed image will be corrected.

6. The method of claim 1 comprising rotating a skewed image about the corner location as an axis of rotation.

7. The method of claim 1 wherein the sensing comprises placing at least two skew sensors in a generally straight line perpendicular to a document flow direction of skewed document and sensing a relative arrival time of a leading edge of the skewed document at the skew sensors to determine a skew angle of the skewed document based on a distance between the two skewed sensors, a speed of the skewed document in the flow direction, and the relative arrival time.

8. The method of claim 1 comprising rotating a skewed image about the corner location by a skew angle in the same direction that a document is skewed to correct the orientation of the skewed image to produce an aligned image.

9. The method of claim 1 wherein the determining of a corner location is determined by identifying a first line equation for a leading edge of the skewed document and a second line equation for a top edge of the skewed image and establishing the corner location at a generally perpendicular intersection of said first and second line equations.

10. A method for providing skew correction information for a skewed image of a skewed document in a scanner, said method comprising:
    (a) reading a first sensor data indicating first skew information about said skewed document when a first sensor is struck by said skewed document;

(b) reading a second sensor data indicating second skew information about said document when a second sensor is struck by said skewed document;

(c) reading a third sensor data indicating third skew information about said document when said second sensor is struck by said skewed document; and (d) determining said skew correction information for said skewed image, using said first, said second, and said third skew information, prior to start of scanning said skewed document.

11. The method of claim 10 wherein said determining said skew correction information for said skewed image includes:

(e) determining a rotation angle for said skewed image; and (f) determining a rotation direction for said skewed image.

12. The method of claim 11 wherein said determining said skew correction information includes:

(g) determining a corner location for said skewed image.

13. The method of claim 12 wherein said determining said skew correction information includes:

(h) determining a corner location for said skewed document.

14. The method of claim 13 wherein said determining said skew correction information includes:

(i) transforming said corner location for said skewed document into a rotated location, wherein said skewed image will be corrected.

15. A system for correcting a skewed image of a skewed document in a scanner, said system comprising:

(a) a plurality of skew sensors located in a straight line perpendicular to the document flow direction of said scanner, said skew sensors providing skew information for said skewed document;

(b) at least one lateral sensor located along said document flow direction, said lateral sensor providing data indicating lateral position of said document;

(c) means for reading said skew sensors and said lateral sensor;

(d) means for determining skew correction information for said skewed image, prior to start of scanning said skewed document; and (e) means for correcting said skewed image during real-time scanning said skewed document.

16. The system of claim 15 wherein said skew sensors and said lateral sensor include encoder counters providing data indicating relative position and orientation of said skewed image.

17. The system of claim 16 wherein said means for determining said skew correction information includes:

(f) means for determining a rotation angle for rotating said skewed image; and (g) means for determining a direction for rotating said skewed image.

18. The system of claim 17 wherein said means for determining said skew correction information includes:

(h) means for determining a corner position for said skewed image.

19. The system of claim 18 wherein said means for determining said skew correction information includes:

(i) means for determining a corner position for said skewed document in a rotated location.

20. The system of claim 19 wherein said means for determining said skew correction information includes:

(j) means for rotating said skewed image such that said skewed image is registered without being skewed.

* * * * *